US 6,481,546 B2

(12) United States Patent
Oliver et al.

(10) Patent No.: US 6,481,546 B2
(45) Date of Patent: Nov. 19, 2002

(54) MAGNETO-RHEOLOGICAL DAMPING VALVE USING LAMINATED CONSTRUCTION

(75) Inventors: Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,745

(22) Filed: Jan. 4, 2001

(65) Prior Publication Data

US 2002/0084157 A1 Jul. 4, 2002

(51) Int. Cl.[7] .................................................. F16F 9/53
(52) U.S. Cl. ..................... 188/267.1; 188/269; 188/283; 188/286; 188/322.15; 188/322.22
(58) Field of Search ............................ 188/267, 267.1, 188/267.2, 266.2, 266.7, 269, 283, 286, 322.15, 322.17, 322.18, 322.22, 322.5; 267/140.14, 140.15; 29/597; 174/126.2

(56) References Cited

U.S. PATENT DOCUMENTS

| 3,882,427 | A | * | 5/1975 | Pflanz ..................... 174/126.2 |
| 5,018,606 | A | * | 5/1991 | Carlson .................... 188/267.1 |
| 5,277,281 | A | | 1/1994 | Carlson et al. |
| 5,284,330 | A | | 2/1994 | Carlson et al. |
| 5,398,917 | A | | 3/1995 | Carlson et al. |
| 5,472,069 | A | * | 12/1995 | Austin ...................... 188/267.1 |
| 5,867,892 | A | * | 2/1999 | Beakes et al. ................. 29/597 |
| 5,878,851 | A | * | 3/1999 | Carlson et al. .............. 188/267 |
| 5,956,951 | A | | 9/1999 | O'Callaghan |
| 6,019,201 | A | | 2/2000 | Gordaninejad et al. |
| 6,095,486 | A | | 8/2000 | Ivers et al. |
| 6,279,700 | B1 | * | 8/2001 | Lisenker et al. ......... 188/267.1 |

* cited by examiner

Primary Examiner—Christopher P. Schwartz
Assistant Examiner—Melanie Torres
(74) Attorney, Agent, or Firm—Scott A. McBain

(57) ABSTRACT

A magneto-rheological damping device comprises a core element capable of acting as a magnetic circuit which carries a magnetic flux, and a case element surrounding a portion of the core element. A passage exists between the case element and core element, and an amount of magneto-rheological fluid is positioned between the core element and case element to flow within the passage.

A magnetic flux generator is positioned adjacent a portion of the core element and is operable to generate a magnetic flux which acts upon the magneto-rheological fluid in the passage to affect the flow of fluid in the passage.

The core element comprises a plurality of stacked laminations, which form a series of individual magnetic poles with gaps therebetween. The magnetic flux generator is operable to generate a magnetic flux in the poles and case element and across the gaps to affect the fluid flow in the passage.

37 Claims, 4 Drawing Sheets

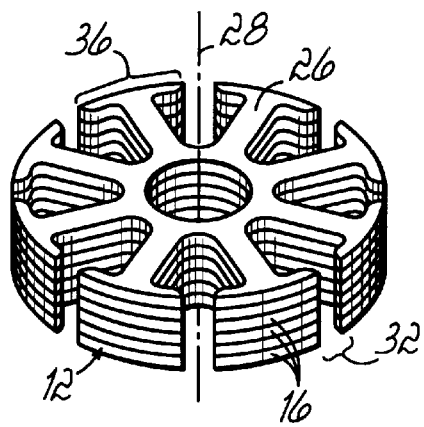
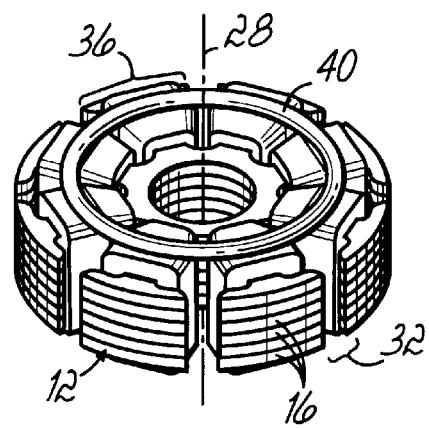
FIG. 3A
FIG. 3B
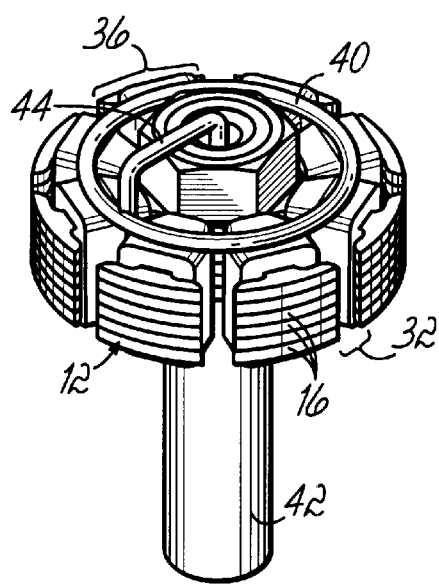
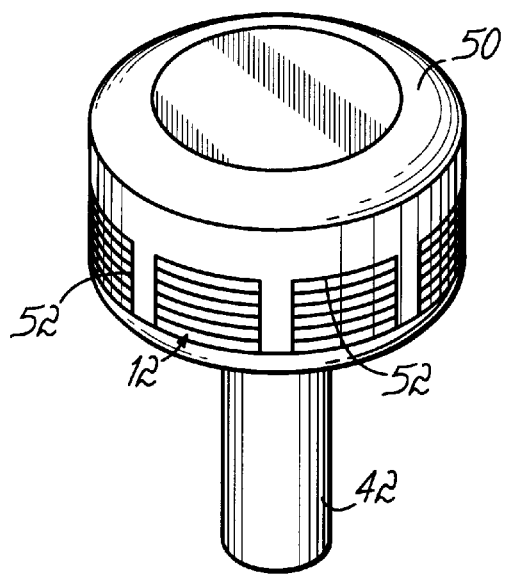
FIG. 3C
FIG. 3D

MAGNETO-RHEOLOGICAL DAMPING VALVE USING LAMINATED CONSTRUCTION

FIELD OF INVENTION

This invention relates generally to Magneto-Rheological (MR) devices and more particularly to an improved design for an MR damping element.

BACKGROUND OF THE INVENTION

Devices for suspending parts and controlling or damping their movement relative to one another, are known in the art. For example, such devices are known and used in the automotive field in vehicle suspension systems. The devices might take the form of shocks, struts and other motion or vibration damping structures.

Generally, many of those devices utilize fluids for controlling the relative movement of the mechanical parts. For example, hydraulic fluid may be utilized as a medium for creating damping forces or torques or controlling motion, shock and vibrations. One class of such movement control devices utilizes a fluid medium which is controllable through the use of magnetic fields. Such magnetically controlled fluid is referred to as magneto-rheological, or MR, fluid and is comprised of small, soft magnetic particles dispersed within a liquid carrier. The particles are often generally round and suitable liquid carrier fluids include hydraulic oils and the like. MR fluids exhibit a thickening behavior (a rheology change), often referred to as "apparent viscosity change," upon being exposed to magnetic fields of sufficient strength. The higher the magnetic field strength to which the MR fluid is exposed, the higher the flow restriction or damping force that can be achieved in the MR device, and vice versa. That is, the flow properties of MR fluids may be selectively altered by magnetic fields.

A typical MR device, for example, utilizes an iron core structure disposed within a metal cylinder or casing which is filled with the MR fluid. The MR fluid flows through a restricted passage or gap within the cylinder or casing or within the core structure itself. The passage, or gap, is magnetically controlled to control the characteristics of the flow of the controllable MR fluid therethrough. To that end, a magnetic field generator, such as a wire coil wound around the core structure, varies the magnetic field in the core and in the fluid passage by variation of electrical current through the coil. The selectively variable magnetic field dictates the characteristics of the fluid in the restricted passage. The relative movement of the parts is then regulated by controlling the characteristics of the fluid.

Existing designs of such MR devices use one or more coils wound in a groove around the outside of the core. However, such designs have certain drawbacks. For example, the damping effects associated with such a design may not be sufficient or desirable for the particular application of the MR device.

Furthermore, such designs utilize core structures and magnetic field generators which may sometimes be difficult and expensive to construct and manufacture.

Still further, the construction of the core structure may sometimes limit its ultimate packaging and the particular uses for such a core.

Therefore, it is an objective of the present invention to improve the performance of MR devices. It is further an objective to do so by improving the core. It is another objective to simplify and enhance the fabrication and manufacturing of such devices and the core elements in such a device. It is still another objective to provide alternative manufacturing and packaging options for the MR devices. These and other objectives will become more readily apparent from the description of the invention below.

SUMMARY OF THE INVENTION

The Magneto-Rheological (MR) damping device of this application addresses the above objectives and utilizes a unique construction for improved performance and enhanced fabrication and manufacturing.

Specifically, the MR damping device comprises a core element capable of acting as a magnetic circuit which carries a magnetic flux. The core element is surrounded by a case element and a passage exists between the case element and the core element. Generally, the size and shape of the case element, which may be in the shape of a cylinder or ring, defines the size and shape of the passage. An amount of MR fluid is positioned between the core element and case element to flow within the passage. A magnetic flux generator is positioned adjacent a portion of the core element and is operable for generating a magnetic flux which acts upon the MR fluid in the passage to affect the flow of fluid in the passage.

In accordance with one aspect of the present invention, the core element has a unique design comprising a plurality of stacked, generally flat laminations which, when stacked, collectively form the core element. The laminations form a series of individual magnetic poles with gaps therebetween, and the magnetic flux generator is operable to generate a magnetic flux in the poles and case element and across the gaps to affect the fluid flow in the passage.

More specifically, the laminations are shaped so that collectively they form a core element comprising a series of arms which project radially from a center axis of the core. The arms form the magnetic poles, and adjacent arms are oppositely magnetically polarized. In that way, the flux is located between adjacent arms and in the case element, and in that way, the magnetic flux extends across the passage and over the gap. Each arm includes an annular head, and the length of the head defines the size of the gap between the alternating magnetic poles. The size and shape of the annular heads of each arm might be adjusted to adjust the gap and thereby adjust the effect which the core element has on the MR fluid.

To form the magnetic flux generator, one embodiment of the invention utilizes electrically conductive coils which are wound around the radially projecting arms. An individual coil is wound around each arm. In order to oppositely polarize adjacent arms, electrical current is directed through the adjacent coils in opposite directions to define the opposite magnetic poles in the adjacent arms. A plastic housing is utilized to encase the core element and magnetic flux generator. The housing leaves the annular heads of the radial arms exposed for direction of the magnetic flux between the core element and the case element and across the passage therebetween. The MR fluid moving between the case element and the core element may thereby be affected by the magnetic fields generated in the passage by the arms of the core element. In one particular use of the invention, the device is used for vehicle suspensions, such as in shock absorbers and struts. However, it may have other uses as well.

With respect to one possible embodiment, the case element includes a fluid inlet and a fluid outlet, and the case element contains the MR fluid which flows between the core element and the case element. By magnetically affecting that fluid flow, the movement of fluid through the inlet and outlet of the damping device is affected. In that way, the damping device acts as a damping valve.

In another embodiment of the invention, a suspension housing, such as in the form of a shock absorber or strut body is utilized to surround the core element. The core element and the case element then form a piston which is movable within the shock absorber or strut body. A suitable piston rod may be coupled to the core element for that purpose. As the piston moves in the shock absorber, and the MR fluid moves past the piston, the magnetic flux in the coils may be selectively controlled to selectively control the damping provided to the piston by the fluid. That is, affecting the fluid flow past the coil element and the case element affects the movement of the piston within the shock absorber. Other uses of the invention in an MR device are also possible.

These features and other features and benefits of the invention are set forth in greater detail below, in the Detailed Description of the invention.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 3A is a perspective view of a core element of one embodiment of the invention.

FIG. 3B is a perspective view of a core element and magnetic flux generator in accordance with one embodiment of the present invention.

FIG. 3C is a perspective view of the embodiment shown in 3B with additional support structure.

FIG. 3D is a perspective view of the embodiment illustrated in FIGS. 3A–3C in combination with a plastic housing encasing the elements.

DETAILED DESCRIPTION OF THE INVENTION

Figure 1:
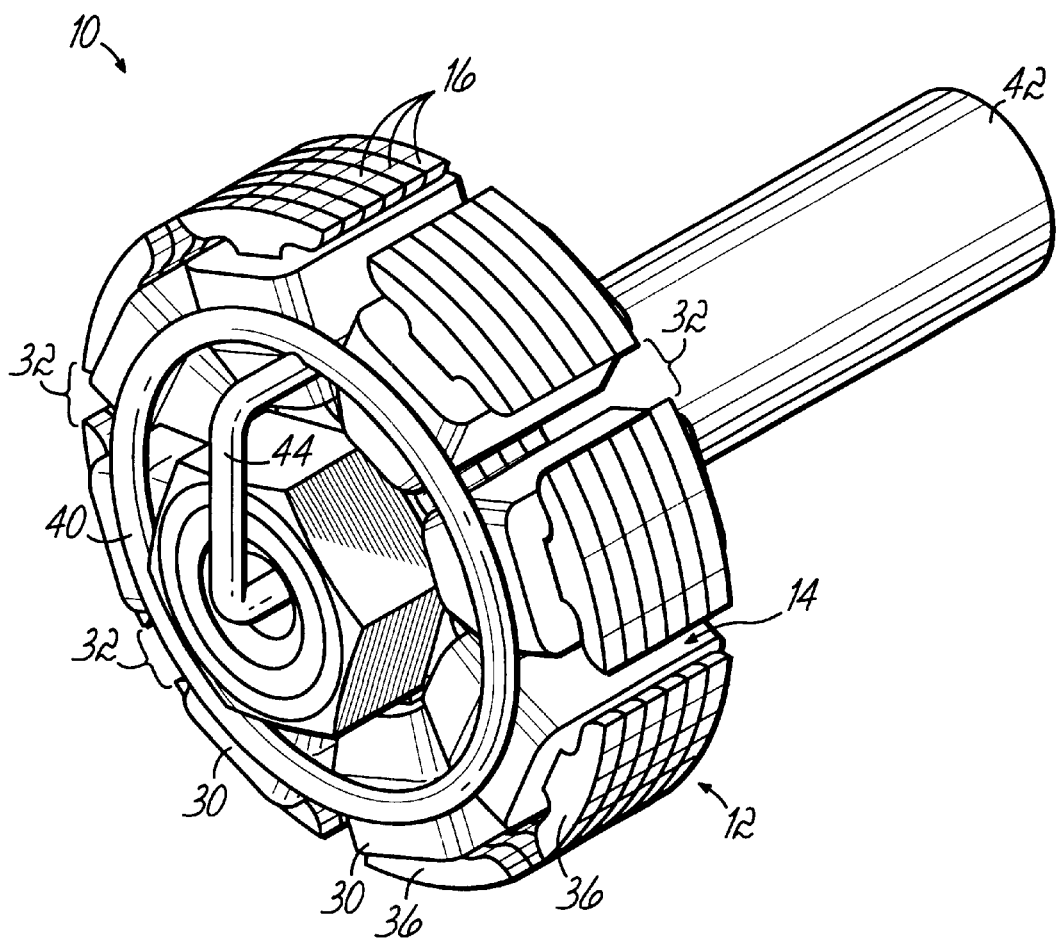
FIG. 1 is a perspective view of one embodiment of the invention.

FIG. 1 illustrates a perspective view of one embodiment of the magneto-rheological damping device in accordance with the principles of the present invention. Throughout the application, magneto-rheological characteristics of the device and fluid utilized therein will be referred to by the initials "MR."

The MR device 10 comprises a core element 12 utilized in combination with a magnetic flux generator 14. The core element will usually be a magnetizable material, such as a ferrous material, which is capable of acting as a magnetic circuit to carry a magnetic flux therein. The magnetic flux within the core element, as is well known in MR devices, affects the flow of the MR fluid past the core element.

In accordance with one aspect of the present invention, core element 12 comprises multiple parts in the form of a plurality of stacked laminations 16. The laminations are generally flat, shaped elements which are stacked to collectively form the core element. In accordance with another aspect of the present invention, the laminations collectively form a series of individual magnetic poles with gaps therebetween. A magnetic flux generator is operable to generate a magnetic flux in the poles which affects MR fluid positioned around the core element.

Figure 2:
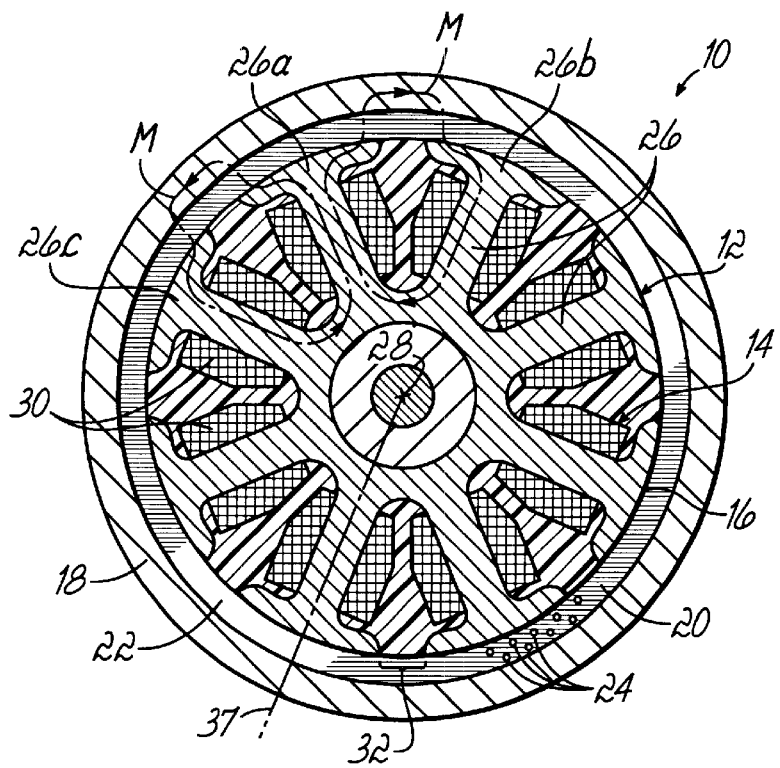
FIG. 2 is a cross-sectional view of an embodiment of the invention.

FIG. 2 illustrates a cross-sectional view of an embodiment of the invention as illustrated in FIG. 1. Core element 12 and magnetic flux generator 14 are surrounded by a case element 18 which defines a passage 20 between the case element 18 and the core element 12. MR fluid 22 is positioned in the passage. Generally, the case element 18 is made of a magnetizable material, such as a ferrous material. The case element 18 may be in the form of a ring or cylindrical housing which surrounds the generally cylindrically shaped core element 12. Although the core and case elements are illustrated as generally cylindrical elements, they might take other shapes as well. As is known with MR devices, magnetic flux within the core element 12 and case element 18 crosses passage 20 and affects the flow of MR fluid 22 in the passage 20. Various different MR fluids are also known in the art. One such MR fluid is a hydraulic fluid which includes small metallic elements 24 therein. Increasing the magnetic flux in the core element 12 and case element 18 allows for selective variation of the flow characteristics of the fluid 22 within the passage 20. The magnetic flux affects the rheology of the fluid, and therefore, its flow characteristics.

In accordance with one aspect of the present invention, and as illustrated in FIG. 2, the laminations of the core element are generally circular in shape and comprise a series of arms 26 which project radially from a center axis 28. The radial arms form the magnetic poles of the core element. Flux lines M are shown illustrating various flux paths within the core element 12 and case element 18. To that end, adjacent arms 26 are oppositely magnetically polarized within the core element. That is, for radial arm 26a, the flux lines M flow away from the arm to the arms 26b and 26c which are oppositely magnetically polarized. Preferably, the materials of the case element and core element have a desirable permeability to maintain the flux within the device and passage 20 as shown in FIG. 2.

In one embodiment of the invention, the magnetic flux generator 14 comprises a plurality of conductive coils 30, wherein each conductive coil is wound around a radially projecting arm 26, as illustrated in FIGS. 1 and 2. Therefore, the coils are also radially oriented with respect to core element 12, as shown in FIG. 2. Electrical current is directed through the electrically conductive coils, and depending upon the direction of such current in the coil, the radial arms are magnetically polarized and a magnetic flux is generated. In accordance with the principles of the present invention, the device 10 of the present invention is configured and coupled to a suitable supply of electrical energy (not shown) such that electrical current is directed through adjacent coils 30 of adjacent radial arms in opposite directions. In that way, adjacent magnetic poles, such as arms 26a and 26b will be oppositely magnetically polarized. To that end, for equal rheology effects around the annular passage 20, the number of magnetic poles of the core element 12 should probably be even to generate symmetrical flux origin and return paths within the magnetic circuit defined in device 10.

As illustrated in FIG. 2, the case element 18 forms a portion of the magnetic circuit and the magnetic flux path that carries the magnetic flux. The magnetic flux in the poles 26 and the case element 18 extends not only across passage 20, but also across the series of gaps 32 between the radially outward ends of each arm of the core element 12. In the embodiment illustrated herein, the core element 12 utilizes radial arms 26 which each include an annular head 36 which is generally wider than the arm. The width and shape of each annular head 36 determines the size of the gap 32 between adjacent poles. In accordance with one aspect of the present invention, the size of the annular head, or shape of the annular head, could be selectively varied to vary the size of gap 32 and thus selectively vary the magnetic characteristics of the device 10 and its effect on the MR fluid 22 as well. As illustrated in FIG. 2, the annular head 36 extends generally perpendicular to the longitudinal axis 37 of the radial arms. The magnetic flux, or flux path M, is shown as a typical flux path within the present invention, although magnetic flux will generally not be completely contained within the device. However, the configuration of the core element 12 and case element 18 and their magnetic permeability are such as to ensure that a significant amount of magnetic flux is retained within the circuit formed by the core element and the case element and passage in order to efficiently affect fluid flow in passage 20.

The present invention provides for improved fluid flow control based upon control of the magnetic flux in device 10. Generally, increasing the current within the conductive coils 30 will increase the magnetic flux M in the device and thereby increase the flow restriction or damping force that can be achieved with the MR device 10. In that way, the present invention may be utilized more effectively in structures such as MR valves and shock absorbers, as discussed further hereinbelow.

Furthermore, the unique construction of the core element allows for selectivity and variation. in the magnetic circuit. For example, the circuit might be varied by increasing or decreasing the size of gap 32 to selectively control the effect on fluid flow. The height or size of the core element might also be adjusted by adding or removing laminations for further control of fluid flow.

The construction of the core element of the present invention provides for enhanced fabrication and manufacturing of such devices and provides alternative manufacturing and packaging options for the MR device. Referring to FIG. 3A, a series of laminations 16 are shown stacked with each other to collectively form the core element 12. The radial arms 26 of each lamination extend radially outwardly from the center axis 28 to form the radial arm of the core element. Similarly, the annular heads 36 are formed. After the core element is formed by stacking together and aligning a plurality of individual laminations, radial arms 26 are each surrounded with an electrically conductive coil 30, which is wound around each arm. The multiple coils 30 form the magnetic flux generator of the invention. Appropriate electrical connections are also made, such as through element 40 to the various coils 30. The coils are electrically biased so as to produce oppositely polarized magnetic poles in the adjacent radial arms around the core element, as illustrated in FIG. 3B.

To that end, electrical current flows in opposite directions in adjacent coils. Referring to FIG. 3C, a support rod 42 is coupled through the center of the core element 12 to provide support for the damping device within a case element or other appropriate structure, such as the valve body of a damping valve or the shock absorber body of an MR shock absorption system. Furthermore, the coils 30 and element 40 may be coupled to an appropriate supply of electrical energy (not shown), and specifically to a current source, through support rod 42 and line 44. Thereafter, as illustrated in FIG. 3D, a plastic housing 50 may be formed to encase the core element 12 and the magnetic flux generator 14, such as the individual coils 30. Plastic housing 50 is formed so as to leave outer surfaces 52 of the annular heads 36 exposed for directing the magnetic flux through the circuit, including the case element and MR fluid.

As discussed above, the MR system or device of the present invention may be utilized in a number of different ways. One field of use is for vehicle suspension. One such specific use is within a damping valve. Another use is within a shock absorption system, although such specific uses are in no way limiting to the usefulness of the present invention.

Figure 4:
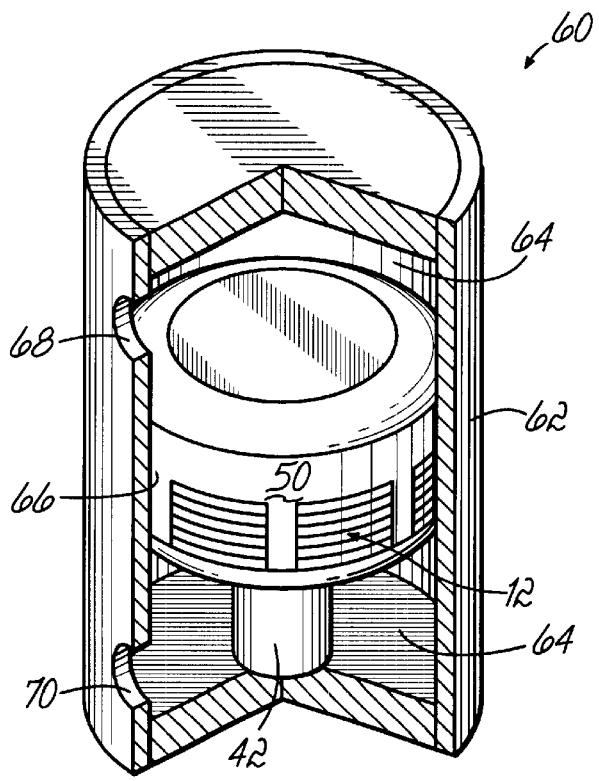
FIG. 4 is a perspective view, partially cut away, illustrating one embodiment of the invention utilized as a damper valve.

Within a damping valve, case element 18 surrounding the core element and magnetic flux generator is in the form of a valve body. Referring to FIG. 4, a damping valve 60 is illustrated, which operates similarly to the device 10, as described above. A valve body 62 surrounds the MR core element 12 and housing 50 similar to the case element 18, discussed above. A suitable amount of MR fluid 64 is positioned in the valve body 62 between the core element 12 and the valve body 62. The fluid flows through the valve body specifically flowing through a passage 66 defined between the core element and valve body. The valve of FIG. 4 would have a cross-section generally like FIG. 2 as illustrated in the Figures. Valve body 62 includes a fluid inlet 68 and a fluid outlet 70 to accommodate the flow of MR fluid into the out of the valve body 62. In the damping valve 60 illustrated in FIG. 4, the valve body 62 is formed of a magnetizable and magnetically permeable material, such as a ferrous material, and thereby acts as a case element surrounding the core element and magnetic flux generator to operate as discussed above. Magnetic flux is generated within the core and valve body and across the gaps between the various poles and across the fluid in the passage between the core element and valve body. In that way, the MR fluid flow is affected to create a damping action by damping valve 60. The valve 60 might be utilized, for example, with a the shock absorber strut and be coupled thereto to provide a damping force for such a structure.

Figure 5:
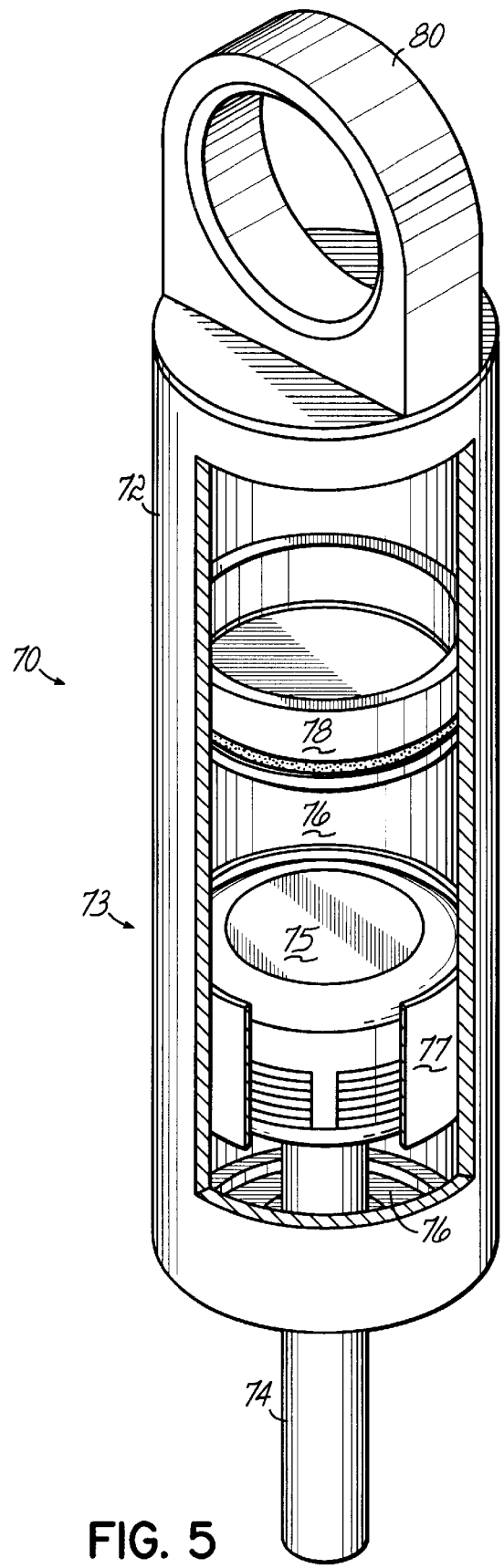
FIG. 5 is a perspective view, partially cut away, illustrating another embodiment of the invention utilized as a shock absorber.

Alternatively, as illustrated in FIG. 5, the MR device of the present invention might be utilized within a shock absorption system. As utilized herein, the terminology "shock absorption system" includes not only shock absorbers, but also struts and other vehicle suspension structures.

Referring to FIG. 5, the shock absorption system 70 utilizes a shock absorber body 72 with a movable piston 73 therein. The piston comprises the core element and magnetic flux generator and case element, as discussed above, movably coupled to the piston rod 74 and movably mounted within the body 72. MR fluid 76 is also positioned in the shock absorber body to flow within the passage between the core element 75 and the case element 77 to facilitate movement of the piston 73 within body 72. The system 70 may also include other seals and pistons, such as floating piston and seal 78 as are typically utilized or desired within certain shock absorbers or struts. For example, pressurized gas on the side of floating piston 78 opposite piston 73 may make up for fluid displacement, such as when the rod 74 is pushed in. This enhances the damping properties of system 70. Furthermore, mounting structure 80 will be utilized for mounting the system 70 within a vehicle suspension system. Although shock absorption systems and damping valves and other similar devices are some possible uses for the MR device of the present invention, such structures are not meant to limit the use of the invention, as it may have implications in other MR systems.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A magneto-rheological damping device comprising:
   a core element capable of acting as a magnetic circuit which carries a magnetic flux;
   a rigid case element surrounding a portion of the core element and a passage existing between the case element and core element;
   an amount of magneto-rheological fluid positioned between the core element and case element to flow within the passage;
   a magnetic flux generator positioned adjacent a portion of the core element and operable to generate a magnetic flux which acts upon the magneto-rheological fluid in the passage to affect the flow of fluid in the passage;
   the core element comprising a plurality of stacked laminations, the laminations forming a series of individual magnetic poles with gaps therebetween, the magnetic flux generator operable to generate a magnetic flux in the poles and case element and across the gaps to affect the fluid flow in the passage.

2. The damping device of claim 1 wherein said core element comprises a series of arms projecting radially from a center axis of the core to form the poles, at least two adjacent arms being oppositely magnetically polarized.

3. The device of claim 2 wherein the radially projecting arms extend generally perpendicular to the center axis.

4. The damping device of claim 2 wherein said magnetic flux generator comprises at least one conductive coil wound around a radially projecting arm so that flux is generated in the arm.

5. The damping device of claim 2 wherein said magnetic flux generator comprises a plurality of conductive coils, each conductive coil wound around a radially projecting arm, the device further configured for directing electrical current through the adjacent coils in opposite directions to create oppositely polarized magnetic poles in the adjacent arms.

6. The damping device of claim 2 wherein said at least one of said arms comprises an annular head positioned at a radially outward end of the arm.

7. The damping device of claim 6 wherein two adjacent arms each include an annular head, the adjacent annular heads defining the gap between the magnetic poles.

8. The damping device of claim 1 further comprising a plastic housing encasing the core element and magnetic flux generator.

9. The damping device of claim 1 wherein said case element includes a fluid inlet and a fluid outlet, the device configured to operate as a damping valve.

10. The damping device of claim 1 further comprising a suspension housing surrounding said core element, case element and fluid, the core element and operable to move as a piston in the suspension housing.

11. The damping device in claim 1, wherein the said core element comprises a plurality of closely stacked laminations.

12. The damping device in claim 1, wherein the said passage is for magneto-rheological fluid flow.

13. The damping device in claim 12, wherein the said core element comprises a plurality of closely stacked laminations.

14. A magneto-rheological damping valve comprising:
   a core element capable of acting as a magnetic circuit which carries a magnetic flux;
   a valve body surrounding the core element and a passage existing between the valve body and core element;
   an amount of magneto-rheological fluid positioned in the valve body and between the core element and valve body to flow within the passage, the valve body including a fluid inlet and a fluid outlet for the fluid to flow into and out of the valve body;
   a magnetic flux generator positioned adjacent a portion of the core element and operable to generate a magnetic flux which acts upon the magneto-rheological fluid in the passage to affect the flow of fluid in the passage;
   the core element comprising a plurality of stacked laminations, the laminations forming a series of magnetic poles with gaps therebetween, the magnetic flux generator operable to generate a magnetic flux in the poles and valve body and across the gaps to affect the fluid flow in the passage and into and out of the valve body.

15. The damping valve of claim 14 wherein said core element comprises a series of arms projecting radially from a center axis of the core to form the poles, adjacent arms being oppositely magnetically polarized.

16. The damping valve of claim 15 wherein said magnetic flux generator comprises a plurality of conductive coils, each conductive coil wound around a radially projecting arm, the valve further configured for directing electrical current through the adjacent coils in opposite directions to create oppositely polarized magnetic poles in the adjacent arms.

17. The damping device of claim 15 wherein at least two adjacent arms each include an annular head, the adjacent annular heads defining the gap between the magnetic poles.

18. The damping device of claim 14 further comprising a plastic housing encasing the core element and magnetic flux generator.

19. A magneto-rheological shock absorption system comprising:
   a shock absorber body;
   a piston coupled to a piston rod and movably mounted in the body;
   the piston comprising a core element capable of acting as a magnetic circuit which carries a magnetic flux and a case element surrounding the core element with a passage existing between the case element and core element;
   an amount of magneto-rheological fluid positioned in the shock absorber body and between the core element and case element to flow within the passage and facilitate the movement of the piston within the body;,
   a magnetic flux generator positioned adjacent a portion of the core element and operable to generate a magnetic flux which acts upon the magneto-rheological fluid in the passage to affect the flow of fluid in the passage;
   the core element comprising a plurality of stacked laminations, the laminations forming a series of magnetic poles with gaps therebetween, the magnetic flux generator operable to generate a magnetic flux in the poles and case element and across the gaps to affect the fluid flow in the passage and affect the movement of the piston in the shock absorber body.

20. The shock absorption system of claim 19 wherein said core element comprises a series of arms projecting. radially from a center axis of the core to form the poles, adjacent arms being oppositely magnetically polarized.

21. The shock absorption system of claim 20 wherein said magnetic flux generator comprises a plurality of conductive coils, each conductive coil wound around a radially projecting arm, the system further configured for directing electrical current through the adjacent coils in opposite directions to create oppositely polarized magnetic poles in the adjacent arms.

22. The shock absorption system of claim 20 wherein at least two adjacent arms each include an annular head, the adjacent annular heads defining the gap between the magnetic poles.

23. The shock absorption system of claim 19 further comprising a plastic housing encasing the core element and magnetic flux generator.

24. A method for producing a magneto-rheological damping device comprising:
    forming a core element by closely stacking a plurality of individual laminations, the stacked laminations collectively forming a series of individual magnetic poles with gaps therebetween, the core element capable of acting as a magnetic circuit which carries a magnetic flux;
    surrounding a portion of the core element with a rigid case element to define a passage between the case element and core element;
    containing an amount of magneto-rheological fluid between the core element and case element to flow within the passage;
    forming a magnetic flux generator adjacent a portion of the core element for generating a magnetic flux which acts upon the magneto-rheological fluid in the passage to affect the flow of fluid in the passage;
    the magnetic flux generator being operable to generate a magnetic flux in the poles and case element and across the gaps to affect the fluid flow in the passage.

25. The method of claim 24 further comprising encasing the core element and magnetic flux generator in a plastic housing.

26. A method for producing a magneto-rheological damping device comprising:
    forming a core element by closely stacking a plurality of individual laminations, the stacked laminations collectively forming a series of individual magnetic poles with gaps therebetween, the core element capable of acting as a magnetic circuit which carries a magnetic flux;
    surrounding a portion of the core element with a case element to define a passage between the case element and core element;
    containing an amount of magneto-rheological fluid between the core element and case element to flow within the passage;
    forming a magnetic flux generator adjacent a portion of the core element for generating a magnetic flux which acts upon the magneto-rheological fluid in the passage to affect the flow of fluid in the passage;
    the magnetic flux generator being operable to generate a magnetic flux in the poles and case element and across the gaps to affect the fluid flow in the passage; and
    wherein said laminations are shaped to collectively form a series of arms projecting radially from a center axis of the core to form the poles, the method further comprising forming the magnetic flux generator to oppositely magnetically polarize at least two adjacent arms.

27. The method of claim 26 further comprising forming the magnetic flux generator by winding at least one conductive coil around a radially projecting arm.

28. The method of claim 26 further comprising winding a conductive coil around a plurality of radially projecting arms, the coils between adjacent arms being configured for having electrical current directed therethrough in opposite directions to create oppositely polarized magnetic poles in the adjacent arms.

29. A method for producing a magneto-rheological damping device comprising:
    forming a core element by closely stacking a plurality of individual laminations, the stacked laminations collectively forming a series of individual magnetic poles with gaps therebetween, the core element capable of acting as a magnetic circuit which carries a magnetic flux;
    surrounding a portion of the core element with a case element to define, a passage between the case element and core element;
    containing an amount of magneto-rheological fluid between the core element and case element to flow within the passage;
    forming a magnetic flux generator adjacent a portion of the core element for generating a magnetic flux which acts upon the magneto-rheological fluid in the passage to affect the flow of fluid in the passage;
    the magnetic flux generator being operable to generate a magnetic flux in the poles and case element and across the gaps to affect the fluid flow in the passage; and
    forming a fluid inlet and a fluid outlet in the case element so that the device is configured to operate as a damping valve.

30. A method for producing a magneto-rheological damping device comprising:
    forming a core element by closely stacking a plurality of individual laminations, the stacked laminations collectively forming a series of individual magnetic poles with gaps therebetween, the core element capable of acting as a magnetic circuit which carries a magnetic flux;
    surrounding a portion of the core element with a case element to define a passage between the case element and core element;
    containing an amount of magneto-rheological fluid between the core element and case element to flow within the passage;
    forming a magnetic flux generator adjacent a portion of the core element for generating a magnetic flux which acts upon the magneto-rheological fluid in the passage to affect the flow of fluid in the passage;
    the magnetic flux generator being operable to generate a magnetic flux in the poles and case element and across the gaps to affect the fluid flow in the passage; and
    surrounding the core element, case element and fluid with a suspension housing such that the core element and case element are operable to move as a piston in the suspension housing.

31. A core element for a magneto-rheological damping device comprising:

a plurality of closely stacked laminations, the laminations forming a series of individual magnetic poles with gaps therebetween;

a magnetic flux generator adjacent a portion of the core element and operable to generate a magnetic flux which acts upon the magneto-rheological fluid; and a series of arms projecting radially from a center axis of the core to form the poles, at least two adjacent arms being oppositely magnetically polarized.

32. The device of claim 31, wherein the radially projecting arms extend generally perpendicular to the center axis.

33. The damping device of claim 31, wherein said magnetic flux generator comprises at least one conductive coil wound around a radially projecting arm so that flux is generated in the arm.

34. The damping device of claim 31, wherein said magnetic flux generator comprises a plurality of conductive coils, each conductive coil wound around a radially projecting arm, the device further configured for directing electrical current through the adjacent coils in opposite directions to create oppositely polarized magnetic poles in the adjacent arms.

35. The damping device of claim 31, wherein said at least one of said arms comprises an annular head positioned at a radially outward end of the arm.

36. The damping device of claim 35, wherein two adjacent arms each include an annular head, the adjacent annular heads defining the gap between the magnetic poles.

37. The damping device of claim 31 further comprising a housing encasing the core element and magnetic flux generator.

* * * * *